R. J. McCOY.
INTERMITTENT RATCHET MECHANISM.
APPLICATION FILED NOV. 26, 1913.

1,129,701.

Patented Feb. 23, 1915.
2 SHEETS—SHEET 1.

Inventor
Robert J. McCoy.

Witnesses
Frederick L. Fox.
J W Garner

By Victor J. Evans.
Attorney

R. J. McCOY.
INTERMITTENT RATCHET MECHANISM.
APPLICATION FILED NOV. 26, 1913.

1,129,701.

Patented Feb. 23, 1915.
2 SHEETS—SHEET 2.

Witnesses
Frederich L. Fre,
J W Garner

Inventor
Robert J. McCoy.
By Victor J. Evans.
Attorney

UNITED STATES PATENT OFFICE.

ROBERT J. McCOY, OF FORT SMITH, ARKANSAS, ASSIGNOR OF ONE-HALF TO JAMES C. DAVIS AND ONE-HALF TO WILLIAM M. CRAVENS, BOTH OF FORT SMITH, ARKANSAS.

INTERMITTENT RATCHET MECHANISM.

1,129,701. Specification of Letters Patent. Patented Feb. 23, 1915.

Application filed November 26, 1913. Serial No. 803,335.

*To all whom it may concern:*

Be it known that I, ROBERT J. McCOY, a citizen of the United States, residing at Fort Smith, in the county of Sebastian and State of Arkansas, have invented new and useful Improvements in Intermittent Ratchet Mechanism, of which the following is a specification.

This invention is an improved compound pulley adapted for use as a propelling mechanism for bicycles and other vehicles, and also adapted for use for raising heavy weights and doing other analogous work, the object of the invention being to provide an improved mechanism of this kind in which a revoluble driven element may be rotated in either direction by an oscillating acting element and connections between said acting element and the revoluble element.

The invention consists in the construction, combination and arrangement of devices hereinafter described and claimed.

Figure 1:
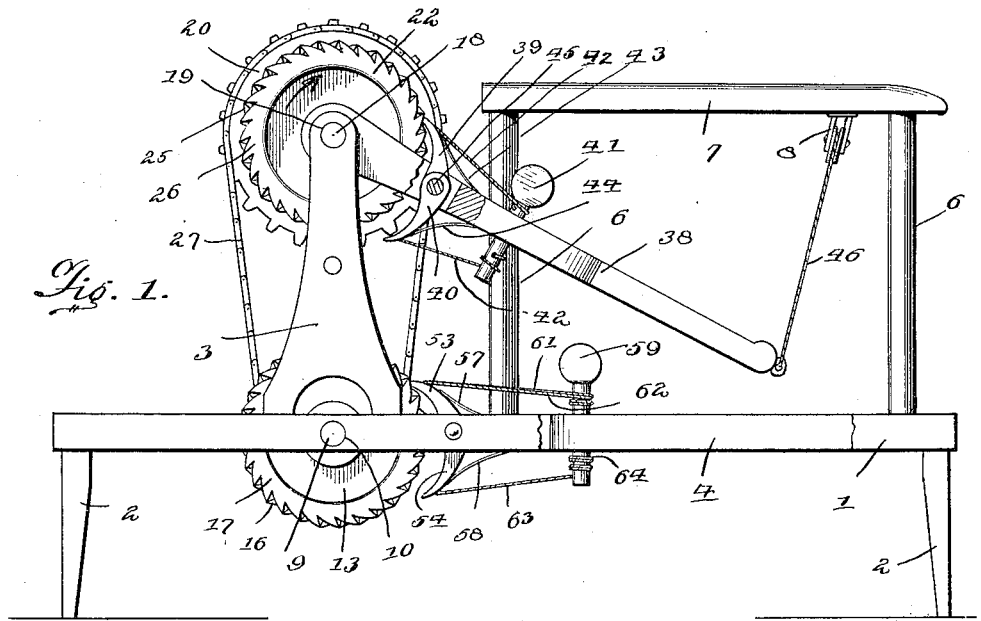
Figure 2:
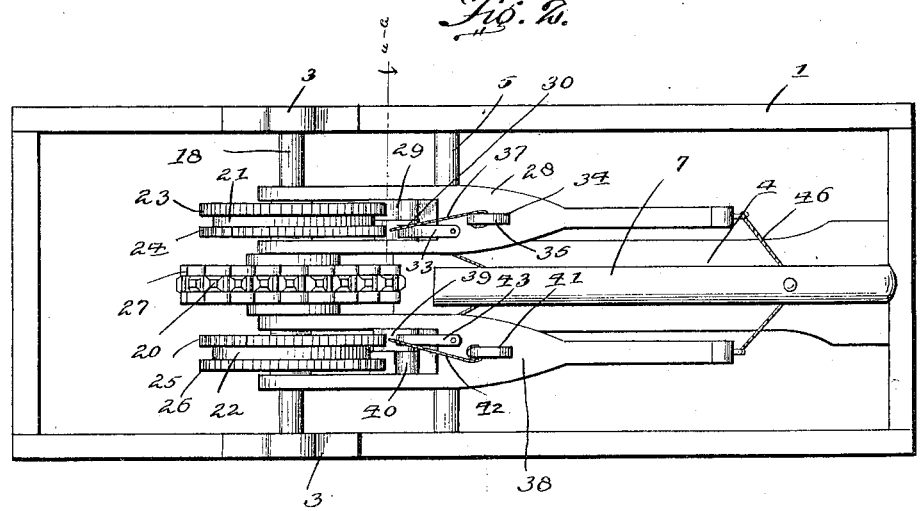
Figure 3:
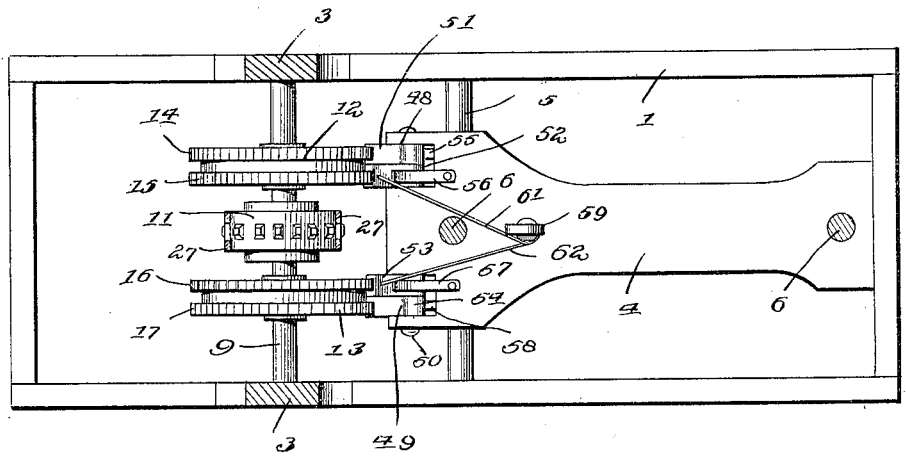
Figure 4:
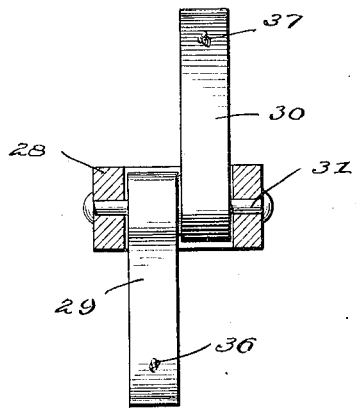

In the accompanying drawings:—Figure 1 is partly a side elevation and partly a vertical sectional view of a compound pulley constructed in accordance with my invention. Fig. 2 is a plan of the same. Fig. 3 is a horizontal sectional view of the same. Fig. 4 is a detail vertical sectional view of the same on the plane indicated by the line *a—a* of Fig. 2.

For the purposes of this specification a suitable rectangular frame is indicated at 1. Supporting legs 2 are shown for the frame and at opposite sides of the frame, at a suitable distance from one end thereof are a pair of standards 3. A base bar 4 is arranged midway between the sides of the frame and has one end secured to one end of the frame and the other end supported by a cross bar 5 with which the frame 1 is here shown as provided. A pair of uprights 6 are on the bar 4 near the ends thereof and a horizontal bar 7 connects the upper ends of the uprights. A pulley 8 is attached to and suspended from the bar 7.

A revoluble driven element, which is here shown as a shaft 9 is mounted in bearings 10 in the sides of the frame and is provided at its center with a sprocket wheel 11. On opposite sides of the sprocket wheel 11 are ratchet wheels 12—13 which are respectively provided with reversely arranged ratchet teeth 14—15, 16—17, the said series of ratchet teeth being spaced apart. The shaft 9 is for transmitting power when desired, as for instance to the driving wheel of a bicycle.

A driving shaft 18 is mounted in bearings 19 near the upper ends of the standards 3 and is provided with a centrally arranged sprocket wheel 20 and with ratchet wheels 21—22 at opposite sides of said sprocket wheel. These ratchet wheels are respectively provided with reversely arranged ratchet teeth 23—24, 25—26. An endless sprocket chain 27 connects the sprocket wheels 11 and 20.

An oscillating lever 28 is forked at one end and its forked arms are arranged astride of the ratchet wheel 21 and pivotally mounted on the driving shaft 18. This lever is provided with pivotally mounted pawls 29—30 for respectively engaging the teeth 23—24 of the ratchet wheel 21. Said pawls have a common pivot 31 and are respectively engaged by springs 33 to apply them to the ratchet wheel. The said lever carries a controlling pin 34 which extends through an opening in the lever and fits closely in said opening so that said pin may be turned and yet frictionally engage in the opening. This pin has a head 35 at its upper end to adapt it to be readily manually turned and is connected by cords 37, respectively, to the pawls 29—30. Hence when the said pin is turned in one direction it winds up one of the cords and pays out the other thus causing one of the pawls to disengage the gear 21 and permitting the other pawl to engage said gear, the pawls being arranged to respectively engage the teeth 23—24 of said gear 21.

A lever 38 which is identical in construction with the lever 28 has its fork arms arranged astride the ratchet wheel 22 and pivotally mounted on the shaft 18. This lever has pawls 39—40 for respectively engaging the teeth 25—26 of the ratchet gear 22 and has a pin 41 connected to said pawls by cords 42, respectively, and the said pawls are respectively engaged by springs 44 and are mounted on a common pivot pin 45. A cord or strap 46 connects the outer ends of the said levers and passes over the pulley 8 so that when one of said levers is depressed the other is raised and hence the levers are caused to simultaneously move in reverse directions.

The end of the bar 4 opposed to the ratchet gears 12—13 is provided with recesses 48—49, respectively, opposite said ratchet gears and a pivot pin 50 is arranged in openings in said bar and extends across said recesses. This pivot pin forms the common pivot for a pair of pawls 51—52 to respectively engage the teeth 14—15 of the gear 12 and for a pair of pawls 53—54 to respectively engage the teeth 16—17 of the ratchet gear 13. Springs 55—56, 57—58 are provided for the said pawls respectively. The pawls 52—53 are connected respectively to a pin 59 by cords 61—62 which are partly wound on said pin in one direction and the pawls 51—54 are respectively connected to the said pin by cords 63—64 which are partly wound on the said pin in the reverse direction. Hence when the pin is turned in one direction the pawls 52—53 will be disengaged from the teeth 15—16, respectively, of the gears 12—13 and the pawls 51—54 will be respectively engaged with the teeth 14—17 of said gears.

The operation of my invention is as follows:—The levers 28—38 are for operation by the feet of a person seated astride of the bar 7. When it is desired to drive the shaft 9 in the direction indicated by the arrow in Fig. 1 the pin 59 will be turned in the required direction to disengage the pawls 51—54 from the teeth 14—17 of the gears 12—13 and to engage the pawls 52—53, respectively, with the teeth 15—16 of said gears. The pin 34 will be turned in the required direction to disengage the pawl 29 from the teeth 23 of the gear 21 to engage the pawl 30 with the teeth 24 of said gear. The pin 41 of the lever 38 will be turned in the required direction to engage the pawl 39 with the teeth 25 of the gear 22 and disengage the pawl 40 from the teeth 26 of said gear 22. On each down stroke of the lever 28 its pawl will slip idly on the teeth 24 of the gear 21 but the strap or cord 46 will cause the lever 38 to move upwardly and hence the pawl 39 of said lever by engagement with one of the teeth 25 of the gear 22 will cause the shaft 18 and hence also the shaft 9 to turn in the required direction. On the ensuing down stroke of the lever 38 its pawl 39 will slip idly on the teeth 25 of the gear 22 but the lever 28 will be caused to move upwardly and hence the pawl 30 of the said lever 28 by engagement with one of the teeth 24 of the gear 21 will cause the shafts 18—9 to continue to turn in the same and required direction.

The sprocket wheel 20 is larger than the sprocket wheel 11. Hence while the shaft 18 is revolved at a comparatively low speed by the levers and their coacting devices the power transmitting shaft 9 is driven at a higher rate of speed.

To reverse the direction of rotation of the said shafts the various pawls will be reversely arranged as will be understood.

Having thus described by invention, I claim:—

In a machine of the class described in combination of a shaft mounted for rotation, two pairs of ratchet wheels on the said shaft and revoluble therewith, the members of each pair of ratchet wheels having reversely arranged ratchet teeth, a pair of oscillating levers mounted on said shaft and each provided with reversely arranged pawls for the respective teeth of one of said ratchet wheels and with springs to move said pawls to engaged position, a pin mounted for turning movement in each of said levers and reversely wound cords on said pins and connected to the respective pawls so that by turning one of said pins in either direction one of said pawls will be engaged with the ratchet wheels and the other teeth disengaged from the pawls of the other ratchet wheels, to cause said levers to move simultaneously in reverse directions.

In testimony whereof I affix my signature in presence of two witnesses.

ROBERT J. McCOY.

Witnesses:
WALTER CHATWELL,
J. W. SEWELL.